Sept. 18, 1928.
H. BAETZ
AIR HEATER
Filed Jan. 6, 1926
1,684,380
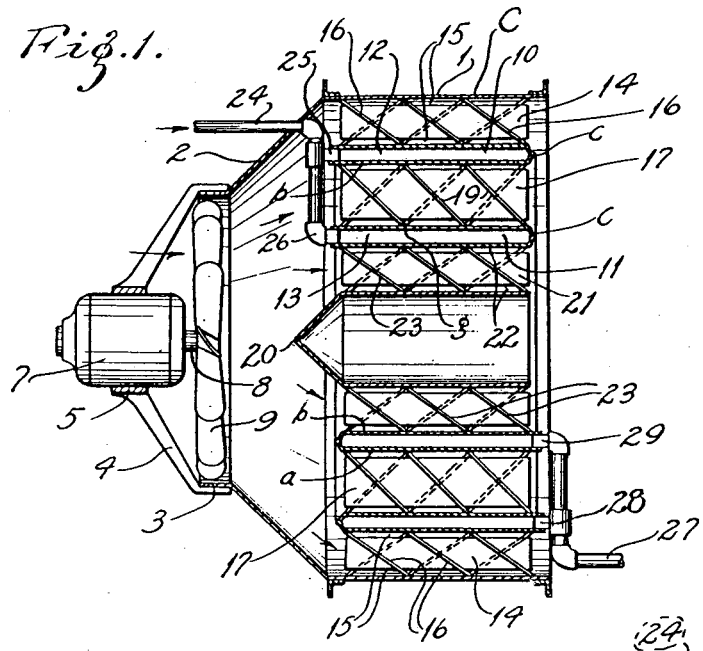
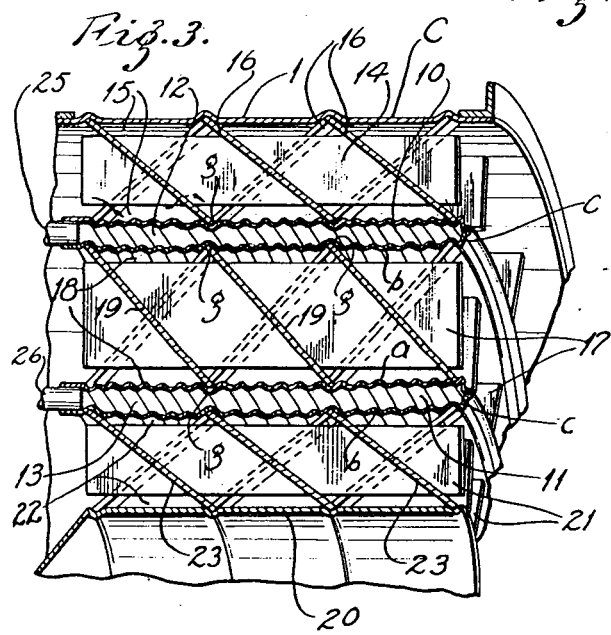
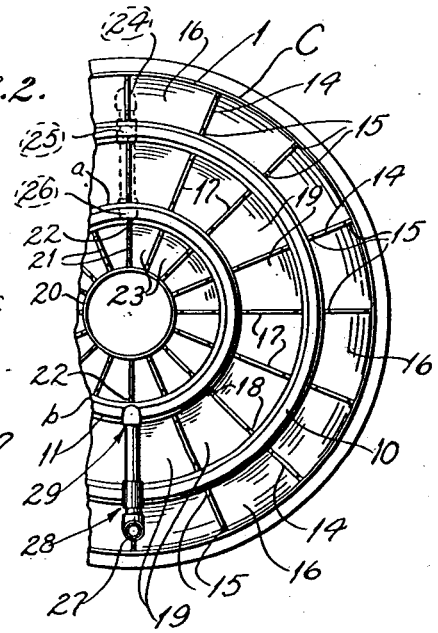
INVENTOR
HENRY BAETZ
BY Harry A. Beimes
ATTORNEY Patented Sept. 18, 1928.

1,684,380

UNITED STATES PATENT OFFICE.

HENRY BAETZ, OF ST. LOUIS, MISSOURI.

AIR HEATER.

Application filed January 6, 1926. Serial No. 79,541.

The present invention has relation to improvements in air heating apparatus and is an adaptation of the principles set forth in my co-pending application on heating apparatus, Serial No. 688,497 filed January 25, 1924. It consists in the novel features of construction more fully set forth in the specification and pointed out in the claims.

As in the invention of the application referred to, one of the objects of the present invention is to provide an air heater wherein all of the air that passes through the heater casing is conducted by suitable passages through the casing, and as the air passes through said casing, it is caused to repeatedly contact with the heating element within the casing. A further object of the present invention is to provide an air heater embodying the above said principles in a compact structure so designed as to possess rigidity, and at the same time occupy a minimum of space; and one that is especially adapted to withstand the expansion and contraction to which the parts are subjected in the course of its operation. Further and other advantages will be better apparent from a detailed description of the invention in connection with the accompanying drawings in which—

Fig. 1 is a middle, vertical, longitudinal section taken through my improved heater with parts in elevation; Fig. 2 is an end elevation of the heater looking toward the outlet end, one side of the casing and associated parts being broken away; and Fig. 3 is an enlarged combined sectional and perspective view of a portion of the heater showing the construction of the heating elements and arrangement of the partitions and deflectors for determining the path of the air through the casing.

Referring to the drawings, C represents the heater casing comprising a cylindrical portion 1 and frusto-conical portion 2 terminating in a neck 3 on which is secured a spider 4 having a hub 5 in which is mounted an electric motor 7 on the shaft 8 of which is disposed a fan 9 for driving a body of air into the casing C. In the present instance, two annular heating elements 10 and 11 are concentrically arranged within the casing, said heating elements having steam chambers 12 and 13 respectively. The longitudinal axes of the heating elements are coincident with that of the cylindrical portion 1 of the casing and said heating elements are spaced from one another, and the outer element 10 is spaced from the casing C.

Arranged in equally spaced relation between the heating element 10 and the portion 1 of the casing, are a plurality of radially disposed partitions 14, the upper and lower edges of said partitions being spaced from the casing and outer surface of the element 10 respectively so as to provide ducts or passageways 15 forming a communication between the spaces on opposite sides of any partition 14. There are also a succession of vanes or deflectors 16 arranged in the space between the casing and heating element, and each pair of adjacent partitions 14, said deflectors being transversely disposed with respect to the partitions 14 and inclined. It will be observed that the deflectors 16 in adjacent spaces or compartments are inclined in opposite directions for a purpose that will more fully appear in the description of the operation of the invention.

There is also a plurality of radially disposed partitions 17 between heating elements 10 and 11, the partitions 17, however, being spaced from both heating elements so as to leave passageways 18, 18 through which the air may pass from compartments on one side of a partition to the other. Arranged in the compartments between the heating elements and between each pair of adjacent partitions 17, are a plurality of deflectors 19, inclined as are the deflectors 16. A drum 20 is disposed on the longitudinal axis of the casing (and of course, of the heating elements 10 and 11) to provide an inner abutment for partitions 21 which are radially disposed between said drum and the heating element 11, said partitions being spaced from the heating element 11 to provide passageways 22 for the same purpose as passageways 15 and 18. Deflectors are disposed between the drum 20 and heating element 11, said deflectors being also inclined so as to deflect the air toward the outlet side of the casing C. The inner end e of drum 20 is conical so as better to divide the air impinging on it.

In order to provide rigidity, the heating elements 10 and 11 are corrugated and are each formed of outer and inner sheets $a, b$, the ends of the sheets being joined together to form seams $c, c$, the corrugations also increasing the heating surface for a given area of the radiator. Along the lines where the deflectors 16, 19 and 23 engage with the heating elements, the corrugations are enlarged to form grooves $g$ to receive said deflectors.

Steam may be admitted to the heating elements 10 and 11 through a steam pipe 24, said pipe having branches 25 and 26 leading to the respective elements 10 and 11. A drain pipe 27 having branches 28 and 29 leading from the elements 10 and 11 is provided to carry off the water of condensation.

The operation of my improved heater will now be described as follows:

Steam is admitted to the heating elements 10 and 11 and in a very short time the walls of said elements become heated, after which the motor 7 is set into operation to rotate the fan 9 which forces a large volume of air into the casing C. Some of this air enters the space between the drum 20 and heating element 11, some enters between the heating elements 10 and 11, and some enters between the heating element 10 and the portion 1 of the casing C, each of these complements of air being immediately divided into streams by the respective partitions 15, 17 and 21. Considering that part of the air which enters between the heating elements 10 and 11, we find that the air stream which enters the compartment between one pair of partitions 17 is deflected by a deflector 19 inwardly against the outer corrugated surface of heating element 11, while the air entering the compartments between the next adjacent pair of partitions is deflected by a deflector 19 outwardly against the inner corrugated wall of heating element 10. These streams, after impinging on the heating elements 10 and 11, are divided so that one half of the air passes on through the right hand duct 18 while the other half of the air passes through the left hand duct, the air thus entering adjacent compartments where it is united with the incoming air stream entering the compartment from the opposite duct communicating therewith. The full air stream in passing through the compartment again encounters a deflector 19 and is again caused to impinge on the heating element. This repeated impingement of the air stream alternately on the heating elements 10 and 11 continues until the air stream is discharged from the casing into the room to be heated. That part of the air which passes through the casing C between the heating element 10 and the casing, will, of course, be caused to impinge on the outer surface of the heating element 10 and the casing, and that part of the air which passes through the casing between the drum 20 and heating element 11 will be caused to impinge on the inner surface of the heating element 11 and the drum in the same manner as the air passing between the two heating elements. Thus all of the air that is moved through the casing is caused to repeatedly contact with a heating surface with the result that the air takes up a maximum number of heat units in its passage through the casing C.

Having described my invention, I claim:

1. An air heater comprising a casing, a plurality of annular heating elements concentrically arranged within the casing, a plurality of radially disposed partitions between said heating elements forming a succession of air passages, said partitions being spaced from the heating elements to provide ducts leading from one passage to that next adjacent, means for moving air through said passages, and deflectors arranged in alternation in adjacent passages to direct the air against the heating elements repeatedly as said air travels from one passage to the next adjacent passage.

2. An air heater comprising a casing, a plurality of annular heating elements concentrically arranged within the casing, a plurality of radially disposed partitions between said heating elements forming a succession of air passages, said partitions being spaced from the heating elements to provide ducts leading from one passage to that next adjacent, means for moving air through said passages, and deflectors arranged in said passages to direct the air against the heating elements.

3. An air heater comprising a casing, a plurality of heating elements concentrically arranged within said casing, means for moving air through the casing, and deflectors disposed transversely across the space between the heating elements for deflecting the air against the heating elements.

4. An air heater comprising a casing, a plurality of heating elements concentrically arranged within said casing, means for forcing air through said casing, and inclined vanes for deflecting said air against the heating elements.

5. An air heater comprising a casing, a circular heating element within the casing, said heating elements having a steam chamber, means for moving air through said casing, partitions for dividing the air into streams, and deflectors between the partitions for directing the air streams into contact with said chamber walls.

6. An air heater comprising a casing, a circular heating element therein, means for forcing air through the casing, and a succession of inclined vanes between the casing wall and heating element for deflecting the air against the heating element.

In testimony whereof I hereunto affix my signature.

HENRY BAETZ.